US007961133B2

(12) United States Patent
Vollin et al.

(10) Patent No.: US 7,961,133 B2
(45) Date of Patent: Jun. 14, 2011

(54) SYSTEM AND METHOD FOR DIVERTING A GUIDED MISSILE

(75) Inventors: Jeff L. Vollin, Tucson, AZ (US);
Frederick A. Ahrens, Tucson, AZ (US);
Kenneth W. Brown, Yucaipa, CA (US)

(73) Assignee: Raytheon Company, Waltham, MA (US)

( * ) Notice: Subject to any disclaimer, the term of this patent is extended or adjusted under 35 U.S.C. 154(b) by 854 days.

(21) Appl. No.: 11/940,425

(22) Filed: Nov. 15, 2007

(65) Prior Publication Data

US 2010/0283657 A1    Nov. 11, 2010

(51) Int. Cl.
*G01S 7/38*    (2006.01)
(52) U.S. Cl. .................. 342/14; 342/53; 342/54; 342/67
(58) Field of Classification Search .............. 342/14
See application file for complete search history.

(56) References Cited

U.S. PATENT DOCUMENTS

| | | | | |
|---|---|---|---|---|
| 4,582,398 A * | 4/1986 | Roberts et al. | ................ | 359/667 |
| H001034 H * | 3/1992 | Lohrmann | ............. | 343/781 CA |
| 5,198,607 A * | 3/1993 | Livingston et al. | ............ | 89/1.11 |
| 5,200,753 A * | 4/1993 | Janusas | ........................... | 342/14 |
| 5,747,720 A * | 5/1998 | Schnurr et al. | ................ | 89/1.11 |
| 6,145,784 A * | 11/2000 | Livingston | .................... | 244/3.11 |
| 6,707,052 B1 * | 3/2004 | Wild et al. | ................ | 250/504 R |
| 6,782,790 B2 * | 8/2004 | Barrett | ........................ | 89/1.11 |
| 6,872,960 B2 * | 3/2005 | Pepper et al. | ............. | 250/495.1 |
| 6,906,659 B1 * | 6/2005 | Ramstack | ....................... | 342/54 |
| 6,977,598 B2 * | 12/2005 | Longbottom | ................ | 340/945 |
| 6,995,660 B2 * | 2/2006 | Yannone et al. | ........... | 340/425.5 |
| 7,282,727 B2 * | 10/2007 | Retsky | ........................ | 250/492.3 |
| 7,378,626 B2 * | 5/2008 | Fetterly | ........................ | 244/3.1 |
| 7,504,982 B2 * | 3/2009 | Berg et al. | ........................ | 342/13 |
| 7,688,247 B2 * | 3/2010 | Anschel et al. | ................. | 342/14 |
| 7,865,152 B2 * | 1/2011 | Brown | ........................... | 455/91 |
| 2002/0149510 A1 * | 10/2002 | Salzeder | ......................... | 342/13 |
| 2006/0000988 A1 * | 1/2006 | Stuart et al. | ............. | 250/504 R |
| 2008/0088496 A1 * | 4/2008 | Thum-Jaeger et al. | ......... | 342/14 |
| 2009/0201206 A1 * | 8/2009 | Li et al. | ........................ | 342/373 |

* cited by examiner

*Primary Examiner* — Thomas H Tarcza
*Assistant Examiner* — Matthew M Barker
(74) *Attorney, Agent, or Firm* — SoCal IP Law Group LLP; John E. Gunther; Steven C. Sereboff

(57) ABSTRACT

The disclosed system, device, and method for diverting a guided missile generally includes a ground-based sensor array generating tracking data of a guided missile tracking a target. A control node in communication with the ground-based sensor array generates targeting data from the tracking data. A phased array directed-energy unit in communication with the control node radiates the guided missile with variable beam width microwave radiation based on the targeting data received from the control node, where the microwave radiation disrupts an electronic component of the guided missile such that the guided missile discontinues tracking the target.

15 Claims, 5 Drawing Sheets

US 7,961,133 B2

SYSTEM AND METHOD FOR DIVERTING A GUIDED MISSILE

FIELD OF INVENTION

The present invention generally concerns anti-missile systems, and more particularly, representative and exemplary embodiments of the present invention generally relate to ground-based systems, devices and methods for disrupting the track of a guided missile.

BACKGROUND OF INVENTION

In various representative aspects, the present invention provides a ground-based anti-missile system. Exemplary features generally include a ground-based sensor array generating tracking data of a guided missile and a control node generating targeting data from the tracking data. Another exemplary feature includes a phased array directed-energy unit radiating the guided missile based on targeting data from the control node, where the radiation disrupts an electronic component of the guided missile such that the guided missile discontinues tracking its intended target.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

SUMMARY OF THE INVENTION

In various representative aspects, the present invention provides a ground-based anti-missile system. Exemplary features generally include a ground-based sensor array generating tracking data of a guided missile and a control node generating targeting data from the tracking data. Another exemplary feature includes a phased array directed-energy unit radiating the guided missile based on targeting data from the control node, where the radiation disrupts an electronic component of the guided missile such that the guided missile discontinues tracking its intended target. The span of the radiation waveform is a function of the guided missile's distance to the phased array.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Figure 1:
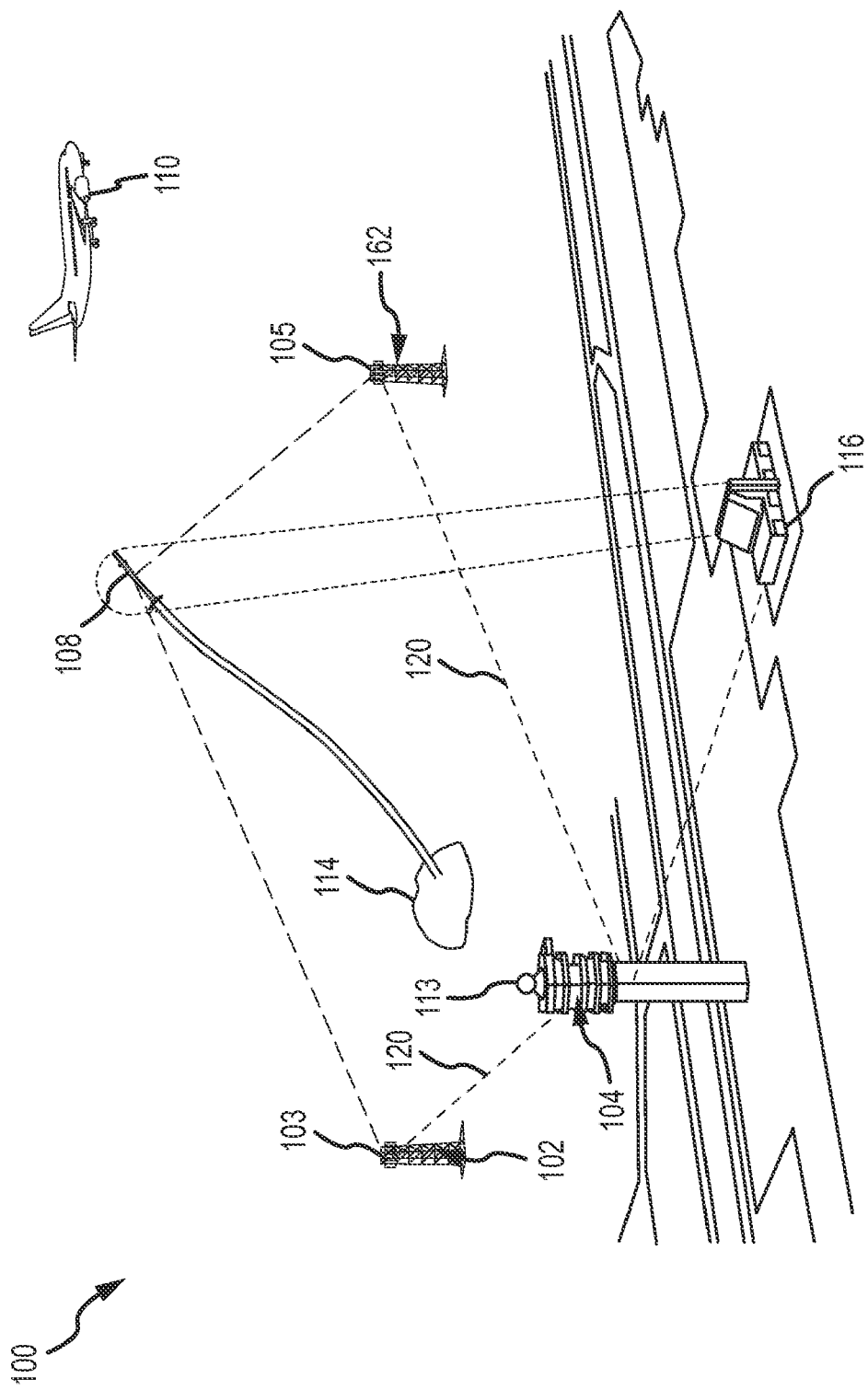
FIG. 1 representatively illustrates an isometric perspective view of a system for diverting a guided missile in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any anti-missile system. For example, certain representative implementations may include phased array directed-energy units used in applications such as anti-missile defense of a fixed target, a water-borne vessel, vehicles, and/or the like.

As used herein, the terms "sensor array", "control node", "phased array directed-energy unit", or any contextual variant or combination thereof, are generally intended to include anything that may be regarded as at least being susceptible to characterization as, or generally referring to, a component of an anti-missile system. A detailed description of an exemplary application, namely a ground-based anti-missile system for use in protecting aircraft at an airport, is provided as a specific enabling disclosure that may be generalized to any application of the disclosed system, device and method for anti-missile defense in accordance with various embodiments of the present invention.

Various representative and exemplary embodiments of the present invention generally provide a system and method for disrupting the tracking of a guided missile. It will be appreciated that additional features may be readily adapted, extended, or otherwise applied to future anti-missile system designs. Accordingly, it will be further understood that the present invention is more generally directed to the generic conceptual approach of implementing a ground-based anti-missile system rather than merely disclosing specific module designs and/or combinatorial permutations.

FIG. 1 representatively illustrates an anti-missile system 100 in accordance with an exemplary embodiment of the present invention. Anti-missile system 100 may include a control node 104 coupled to a ground-based sensor array 102 and at least one phased array directed-energy unit 106. Anti-missile system 100 may be deployed to protect one or more targets 110, for example an aircraft, from one or more guided missiles 108 such as MANPAD missiles, and/or the like. One anti-missile system 100 may be used to protect all targets in a defined space as opposed to each potential target having its own anti-missile defense system.

An example of a guided missile 108 is a shoulder-launched MANPAD missile, which is an infrared (IR) direct threat weapon that may require line-of-sight (LOS) to be established prior to launch. In-flight, the shoulder-launched guided missile may maintain LOS with the target's heat source until impact (or detonation of the proximity fuse). A guided missile 108 may have a tracking system other than IR, or the guided missile may not require LOS to be launched.

In a representative embodiment, anti-missile system 100 may provide protection to a target 110 from one or more guided missiles 108 in a defined space; for example, a hemispherical space over a given area. A guided missile 108 fired at a target 110 may be tracked and engaged by anti-missile system 100 to divert the guided missile 108 from its target 110. In an exemplary aspect, anti-missile system 100 may be deployed at an airport such that targets 110 (i.e., aircraft) are protected during takeoff and landing, when they are most vulnerable to a guided missile 108 attack.

Anti-missile system 100 may be suitably configured to detect the launch of a guided missile 108, alert a control node 104, track the guided missile flight and/or relay this information to control node 104 throughout the duration of the guided missile flight. Control node 104 may then direct one or more phased array directed-energy units 106 to radiate guided missile 108 with electromagnetic (EM) radiation such that guided missile 108 discontinues tracking target 110 or fails to reach target 110. EM radiation may be RF (radio frequency), microwave, millimeter wave, or any other suitable type of radiation.

Ground-based sensor array 102 may be coupled to control node 104 via one or more wireline or wireless communication links 117. Further, phased array directed-energy unit 106 may be coupled to control node 104 via one or more wireline or wireless communication links 117.

In an exemplary embodiment, ground-based sensor array 102 may be a ground-based array of a plurality of sensors 103, 105, for example and without limitation: radar; infrared sensors; active imaging sensors; laser-illumination sensors; ultra-violet sensors; and/or the like. In another exemplary embodiment, ground-based sensor array 102 may comprise a radar unit, in which case only one radar unit may be used to ascertain the position and/or flight path of the guided missile 108. In another embodiment, the ground-based sensor array may comprise phased array directed energy unit 106, which may be configured to also function as a radar system. In another representative embodiment, sensors 103, 105 may comprise a plurality of infrared sensors that are able to detect low-level signatures (e.g., a heat plume from a guided missile) in a high-clutter (i.e., noisy) background environment. Each infrared sensor may, for example, ascertain angular coordinates of a guided missile 108 relative to the fixed location of the sensor. Infrared sensors may comprise, for example and without limitation: charge coupled device image sensors; focal plane array sensors; and/or the like, with a sufficient pixel count to have a desired pixel density and/or resolution to detect and track a guided missile in a defined space.

Each of plurality of sensors 103, 105 may be mounted on a tower, building or other fixed or portable object. Sensors 103, 105 may be fixed or portable, such that they are re-deployable to any number of locations. Fixed or portable sensors may be mounted in an inconspicuous location such as a cell tower, telephone pole, building, and/or the like, to disguise their location. Two or more of sensors 103, 105 may be positioned on the periphery or inside a defined area of, for example, an airport. One or more of a plurality of sensors 103, 105 may detect the launch of a guided missile 108 and track guided missile 108 while relaying tracking data 120 of guided missile 108 to control node 104. Tracking data 120 may include at least one of a position and a vector of guided missile 108 during its flight, the launch point 114 of guided missile 108, and/or the like. In another embodiment, tracking data 120 from each sensor may include angular coordinates of guided missile 108 based on the location of a sensor relative to guided missile 108.

Control node 104 may be a fixed or portable unit comprising any number and/or type of computing devices, processors, memory, communication devices, antennas, man-machine interfaces, and/or the like. Control node 104 may be in one location or distributed among any number of locations. In a representative embodiment, control node 104 may be part of control tower 113 of an airport and be coupled to the communication systems of control tower 113. In another embodiment, control node 104 may be a node located separately from control tower 113. In yet another embodiment, control node 104 may be a portable unit mounted in a vehicle or other portable device making it re-deployable to any number of locations. Control node 104 may be manned or substantially automated. Control node 104 may also be controlled locally or from a remote location.

In an exemplary embodiment, control node 104 may be coupled to ground-based sensor array 102, through communication links 117 (irrespective of whether ground-based sensor array 102 comprises one or more sensors). In another embodiment, control node 104 may be suitably adapted to coordinate communication between ground-based sensor array 102 and phased array directed-energy unit 106, an airport control tower 113 and any security apparatus or personnel. Control node 104 may be coupled to receive tracking data 120 of ground-based sensor array 102 upon detection of a launch of guided missile 108.

In a representative aspect, control node 104 may be configured to process tracking data 120 to generate targeting data 122 of guided missile 108. For example, each of a plurality of sensors 103, 105 may provide angular coordinates of guided missile 108. Control node 104 may then process the angular coordinates received from each of a plurality of sensors 103, 105 to produce at least one of a position and a vector of guided missile 108. Upon receiving angular coordinates from plurality of sensors 103, 105, control node 104 may triangulate the position or vector of guided missile 108 in free space. In another embodiment, control node 104 may alternatively, conjunctively, or sequentially calculate the launch point 114 of guided missile 108 from tracking data 120 received from one or more of plurality of sensors 103, 105. Security forces may then be dispatched to launch point 114 to intercept those responsible for the launch. In yet a further embodiment, one or more of plurality of sensors 103, 105 may provide a position and/or a vector of guided missile 108, and control node 104 may process and/or communicate such information to other entities (e.g., phased array directed-energy unit 106, control tower, security personnel, and/or the like).

In an exemplary embodiment, control node 104 may determine when phased array directed-energy unit 106 engages guided missile 108 in addition to sending the necessary targeting data 122 to phased array directed-energy unit 106. In another embodiment, control node 104 may receive the location of other aircraft or targets in the area so that phased array directed-energy unit 106 does not radiate such vehicles.

Phased array directed-energy unit 106 may be coupled to receive targeting data 122 from control node 104 and radiate guided missile 108 with EM radiation, such as, for example and without limitation, microwave radiation 112. In a representative embodiment, phased array directed-energy unit 106 may include one or more phased array antennas coupled to radiate a narrow beam of modulated energy (e.g., microwave energy) into free space. Phased array directed-energy unit 106 may be solid state or use tubes, klystrons, injection-lock magnetrons, and/or the like. It will be appreciated that any system or method, whether now known or otherwise hereafter described in the art, may be alternatively, conjunctively, or sequentially employed to produce directed EM radiation to achieve a substantially similar result.

In an exemplary embodiment, phased array directed-energy unit 106 may comprise a self-contained power source 116 that may be suitably adapted to provide part or all of the power necessary to operate phased array directed-energy unit 106. Self-contained power source 116 may include, but is not limited to, one or more batteries, a generator, fuel cell, solar array, flywheels, and/or the like. Self-contained power source 116 may be used to eliminate or otherwise reduce power requirements from the electric grid to operate phased array directed-energy unit 106. Self-contained power source 116 may be alternatively, conjunctively or sequentially employed to keep phased array directed-energy unit 106 substantially powered-up in a "standby" mode so as to reduce the time it takes to radiate guided missile 108 once a launch is detected.

Phased array directed-energy unit 106 may be suitably configured to direct energy in a particular direction by a means other than a projectile (i.e., transfers energy to a target for a desired effect). A phased array may comprise a group of antennas in which the relative phases of the respective signals feeding the antennas are varied in such a way that the effective radiation pattern of the array is reinforced in a desired direction and suppressed in undesired directions. The relative amplitudes of and constructive and destructive interference effects among the signals radiated by the individual antennas generally determine the effective radiation pattern of the array. A phased array may be used to point a fixed radiation pattern, or to scan relatively rapidly in azimuth or elevation. Contrary to dish or slotted array antennas, which use physical shape and direction to form and steer the beam, phased array antennas utilize the interference between multiple radiating elements to achieve beam forming and beam steering. By electronically adjusting the signal each element radiates, the combined radiation pattern may be scanned and shaped at high speed and targeted relatively rapidly from one target to another in the event of a substantially simultaneous attack by two or more missiles.

This relative amplitude and phase state of the radiation pattern may be produced by controllable attenuators and phase shifters coupled to corresponding antenna elements or by beamforming networks disposed between a plurality of beam ports and a plurality of antenna elements, where each beam port corresponds to one of the beams. Phased array directed-energy unit 106 may radiate any number of guided missiles, where the radiation "beams" may be electronically steered so as to instantaneously radiate and track one or more guided missiles 108.

In a representative embodiment, phased array directed-energy unit 106 may radiate one or more guided missiles 108 with microwave radiation 112 based on targeting data 122 from control node 104 such that microwave radiation 112 disrupts an electronic component of guided missiles 108 so that guided missiles 108 discontinues tracking the target 110. Microwave radiation 112 may be modulated so that it disrupts one or more electronic components on guided missile 108.

Modulation may include varying one or more characteristic of one radiation source with one or more characteristic of another radiation source. Examples of modulation may include amplitude modulation, frequency modulation, phase modulation, or any combination thereof. As an example of amplitude modulation, when two sinusoidal waveforms of different frequency are added together (where the peak and trough positions of the two waveforms do not coincide) wave interference occurs. This produces a resultant waveform with differing amplitude, frequency, and envelope to the original waveforms. Microwave radiation 112 may be modulated to produce a variation in amplitudes, frequencies, and the like, so as to disrupt one or more electronic components on guided missile 108.

In a representative embodiment, as the range to the guided missile 108 decreases, the beam of the phased array directed energy unit 106 shall be spoiled to make use of available power. Power decreases as a function of $1/R^2$. This spoiled beam will reduce the dynamic accuracy requirements of targeting the guided missile 108. This spoiled beam can be created through sending a software command to each transmit module in the high power microwave amplifier transmitter simultaneously. As range to the guided missile 108 increases, the beamwidth of the microwave radiation 112 shall be focused more tightly to achieve greater range.

$\psi$=wave function for irradiation
$\psi_O$=spherically symmetric
$R_{CM}$=guided missiles distance to directed energy unit (counter measure)

$$F_{Focusing}^{Phase}(\psi_O) \rightarrow \psi_{focused}$$

$$F_{Spoiling}^{Phase}(\psi_{focused}, R_{CM}) \rightarrow \psi_{spoiled}$$

Figure 2:
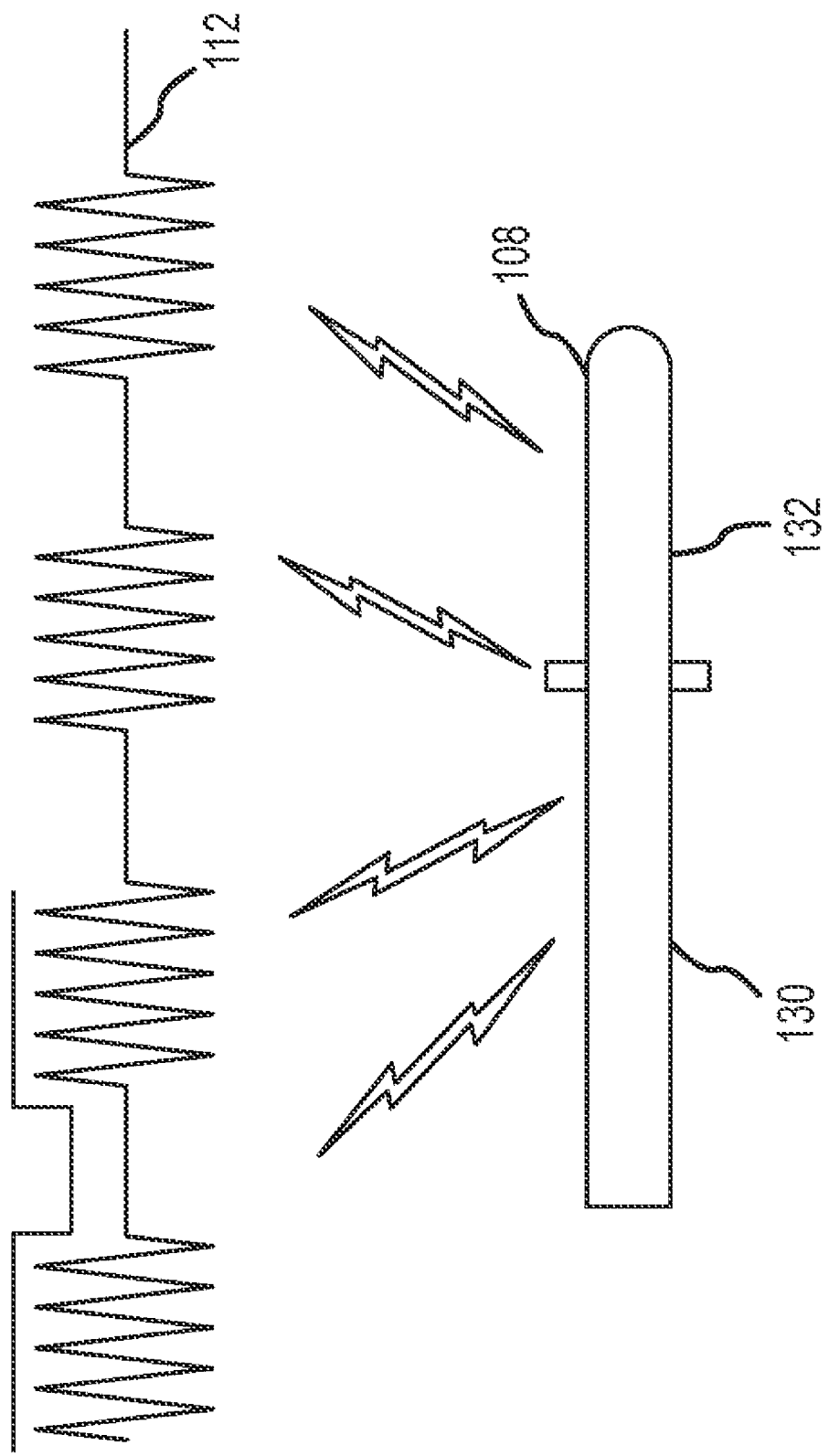
FIG. 2 representatively illustrates an isometric perspective view of a guided missile in accordance with an exemplary embodiment of the present invention.

$\psi_{focused}$=phased array focusing
$\psi_{spoiled}$=phased array defocusing of $\psi_{focused}$ FIG. 2 representatively illustrates guided missile 108 of FIG. 1 in accordance with an exemplary embodiment of the present invention. Guided missile 108 may include a guidance system 130 and a sensor system 132. Guidance system 130 and/or sensor system 132 may comprise one or more electronic components, such as processors, memory, circuit boards, sensors, power sources, and/or the like. For example, guidance system 130 may comprise one or more guidance system electronic components, and sensor system 132 may comprise one or more sensor system electronic components. Guidance system 130 may operate to provide thrust, course correction, navigation, and/or the like, to guided missile 108. Sensor system 132 may operate to track a target 110 of guided missile 108. For example, sensor system 132 may track an aircraft using IR sensors, and/or the like.

When guided missile 108 is radiated with modulated microwave radiation 112 from phased array directed-energy unit 106, the normal function of at least one of guidance system 130 and sensor system 132 may be disrupted so as to disrupt the tracking of guided missile 108 on target 110. Disrupting the track of guided missile 108 may include breaking a target lock on the target 110, causing a course deviation such that the guided missile misses the target 110, or any other malfunction of guided missile 108 such that guided missile 108 discontinues tracking or does not hit or detonate near its intended target 110.

Modulated microwave radiation 112 may operate to disrupt an electronic component of guided missile 108 by, for example and without limitation, introducing noise or spurious signals, confusing or overwhelming onboard sensors, creating false electronic signals, and/or the like. By disrupting one or more electronic components of at least one of guidance system 130 or sensor system 132, modulated microwave radiation 112 may cause the guided missile to stop tracking the target or otherwise deviate from its course such that the guided missile 108 misses the intended target 110.

In an exemplary embodiment, phased array directed-energy unit 106 may be fixed or portable. For example, phased array directed-energy unit 106 may be in a fixed location and designed to appear as a building, billboard, tower, and/or the like. In another embodiment, phased array directed-energy unit 106 may be portable, for example, mounted in a vehicle such as a truck, boat, space vehicle, and/or the like. In yet another embodiment, phased array directed-energy unit 106 may be of modular construction such that it may be assembled and sized to fit a particular application in any given location.

Figure 3:
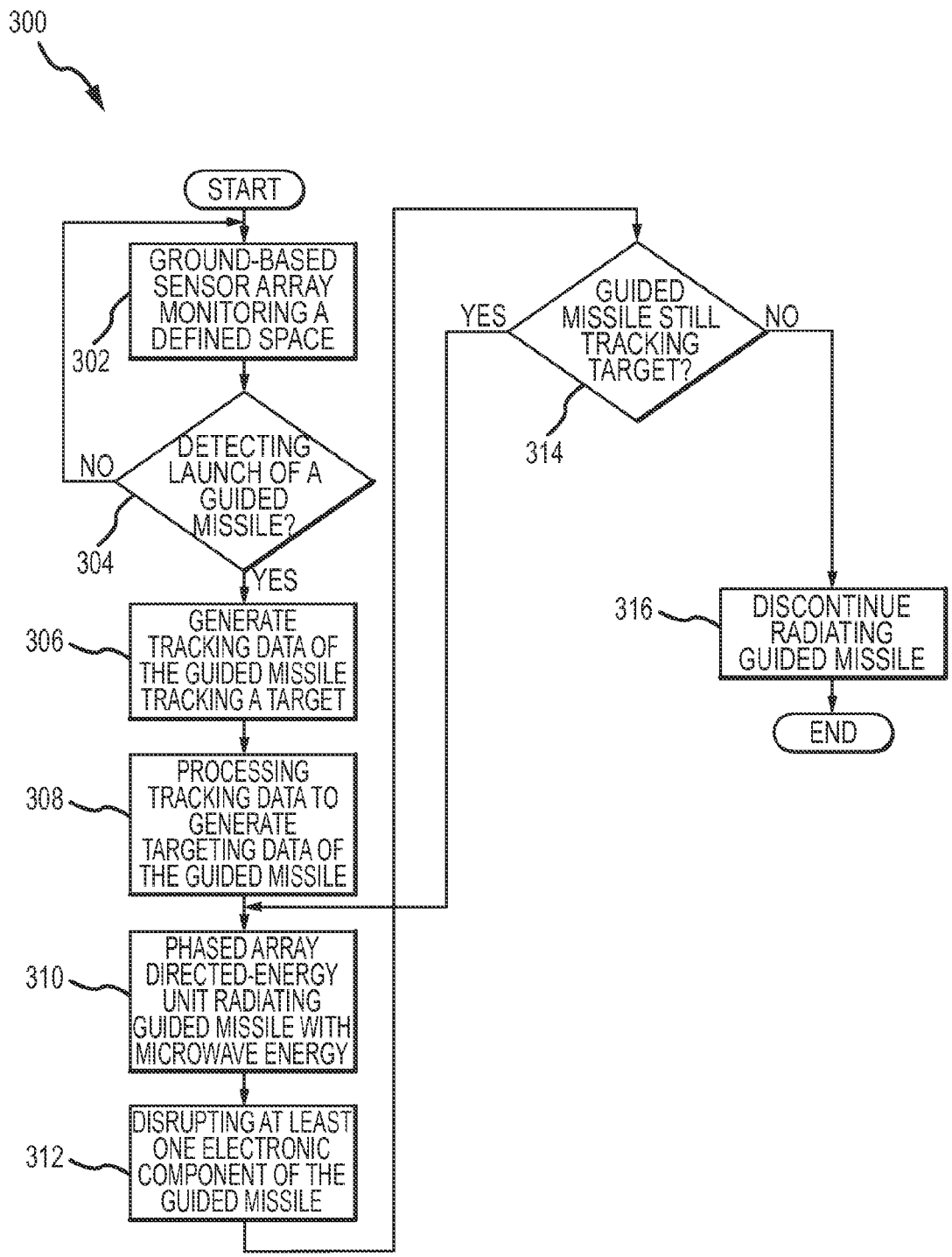
FIG. 3 representatively illustrates an operational flow chart in accordance with an exemplary embodiment of the present invention.

FIG. 3 representatively illustrates a flowchart in accordance with an exemplary embodiment of the present invention. A representative method embodiment of the present invention begins in step 302 with a ground-based sensor array monitoring a defined space for launch of a guided missile. For example and without limitation, ground-based sensor array may monitor the airspace over an airport, sports stadium, power plant, building, and/or the like. In an exemplary embodiment, ground-based sensor array may comprise one or more radar sites actively monitoring the defined space. In another embodiment, ground-based sensor array may comprise a plurality of IR sensors passively monitoring the defined space for launch of a guided missile.

In step 304, ground-based sensor array detects the launch of a guided missile or the intrusion of a guided missile into the defined space being monitored. If no intrusion or launch is detected, the method returns to step 302 (e.g., monitoring of the defined space). If a launch or intrusion is detected, the method moves to step 306 where the ground-based sensor array generates tracking data of the guided missile. For example, if ground-based sensor array comprises one or more radar sites, then an actual position and vector of the guided missile may be generated. If ground-based sensor array comprises a plurality of IR sensors, then angular coordinates from each IR sensor may be generated based on the location of each of the plurality of IR sensors. The guided missile may be tracking a target in the defined space, such as an aircraft, and/or the like. The guided missile may also be targeted on a fixed target such as a building, and/or the like. Tracking data may be communicated to a control node.

In step 308, a control node receives tracking data from the ground-based sensor array. The control node may process tracking data to generate targeting data of the guided missile. Targeting data may comprise a position and/or a vector of the guided missile. For example, upon receiving a plurality of angular coordinates from a plurality of IR sensors, the control node may triangulate the position and vector of the guided missile. Once targeting data is computed, the control node may communicate targeting data to one or more phased array directed-energy units.

In step 310, a phased array directed-energy unit radiates the guided missile with microwave radiation suitably focused or spoiled based on the targeting data received from the control node. In step 312, the microwave radiation disrupts at least one electronic component of the guided missile such that the guided missile discontinues tracking the target. In a representative embodiment in accordance with the present invention, an electronic component in the sensor system of the guided missile may be disrupted through the introduction of spurious signals, and/or the like, such that the guided missile loses a target lock on its target. In another exemplary embodiment, an electronic component in the guidance system of the guided missile may be disrupted such that the guided missile changes course and diverges from the target. It will be understood that these embodiments comprise representative aspects of exemplary applications, and that disruption of any electronic component of a guided missile is to be considered within the scope of the present invention.

In step 314, a determination as to whether the guided missile is continuing to track the target may be made. If so, phased array directed-energy unit continues radiating the guided missile in step 312. Alternatively, conjunctively, or sequentially, phased array directed-energy unit may increase or decrease the power level of microwave energy radiating the guided missile to further affect disruption of an electronic component. Also, alternatively, conjunctively, or sequentially, phased array directed-energy unit may alter the modulation and/or carrier frequency of microwave energy irradiating the guided missile to further effect disruption of an electronic component disposed therein. If the guided missile is no longer tracking the target in step 314, then phased array directed-energy unit may be configured to discontinue irradiation of the guided missile in step 316. Determination of whether the guided missile is still tracking the target may include, but is not limited to, evaluating whether the guided missile is no longer airborne or evaluating whether the guided missile is headed in a direction substantially divergent from the target, and/or the like.

In an alternative exemplary embodiment, the control node may calculate the launch point of the guided missile and alert authorities to both the launch point and the fact that a guided missile is in the air, so that other potential targets in the area may be diverted and/or notified.

Although FIG. 1 depicts a single guided missile and a single target 110, anti-missile system 100 is not limited by this representative depiction. Anti-missile system 100 may simultaneously track and radiate any number of guided missiles tracking any number of targets in a substantially defined space. For example, and without limitation, anti-missile system 100 may track and radiate two guided missiles tracking a first target, while at the same time tracking and radiating two guided missiles tracking a second target. Alternatively, conjunctively, or sequentially, multiple phased array directed energy units may be positioned, for example, along a flight/take-off/landing path whose beams may be substantially simultaneously radiated to sum together at the MANPAD device.

Although the above embodiments describe a representative anti-missile system 100 targeting and disrupting a guided missile targeted on an aircraft or other moving target, the invention is not limited by these embodiments. For example, anti-missile system 100 may track and disrupt a guided missile targeted at an asset other than that of an aircraft, such as, for example, a tank, truck, ship, and/or the like. Further, anti-missile system 100 may track and disrupt a guided missile targeted on a fixed target, such as a building, bridge, power plant, and/or the like.

Figure 4:
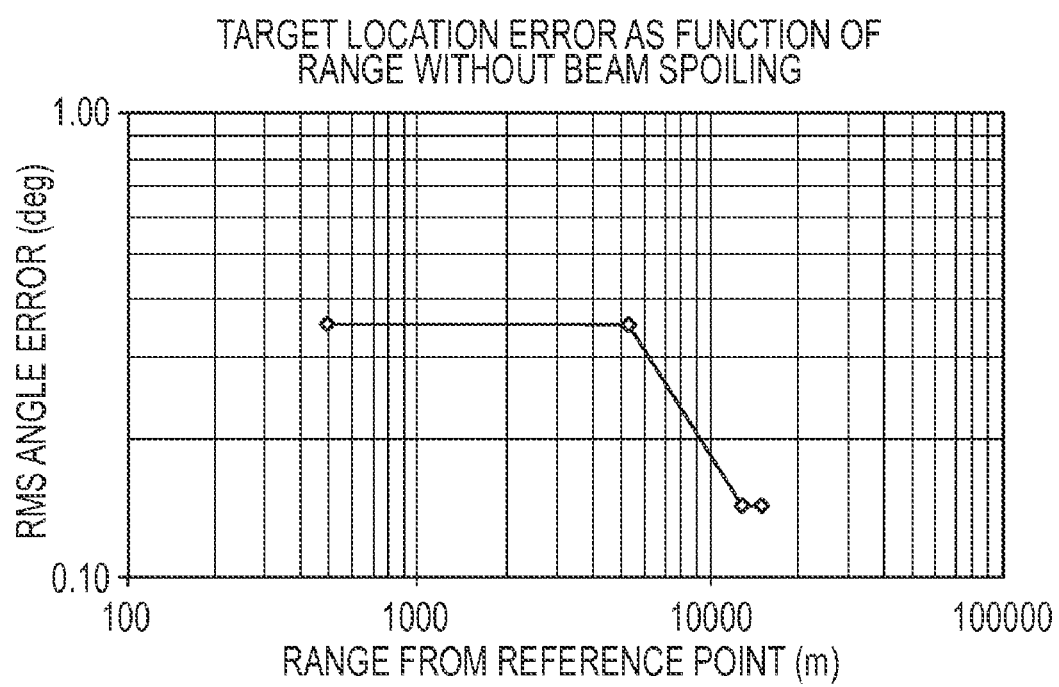
FIG. 4 is a graph depicting target location error budget as a function of range without wave form beam spoiling.

FIG. 4 is a representative graph depicting target location error budget as a function of range without wave form beam spoiling.

Figure 5A:
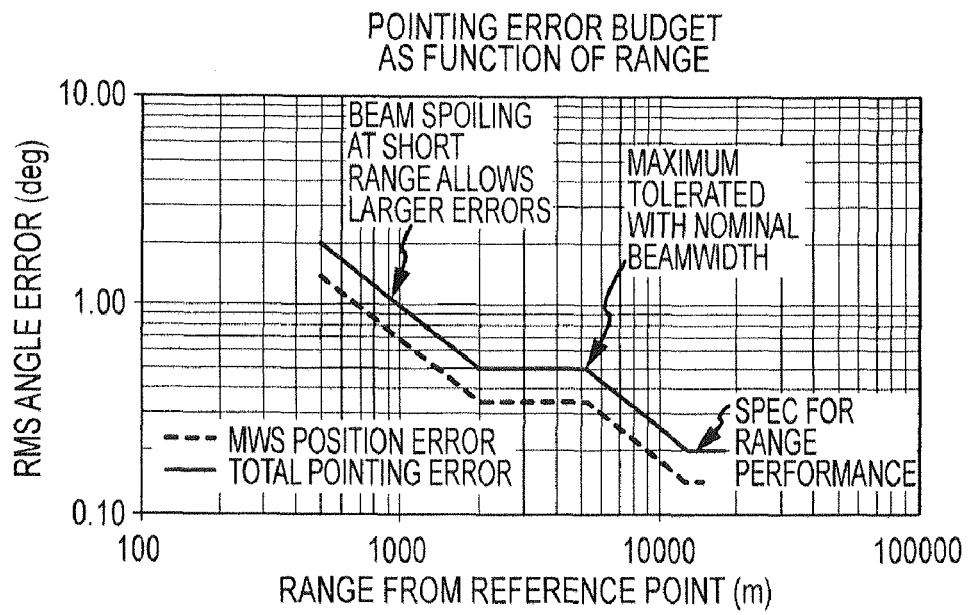
FIG. 5 representatively illustrates the effect of wave form beam spoiling in accordance with an exemplary embodiment of the present invention.
Figure 5B:
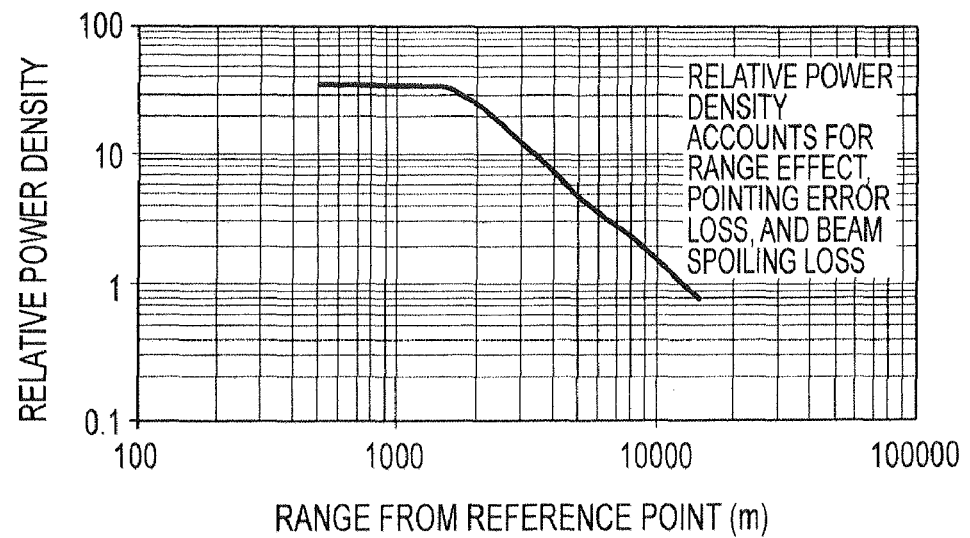

FIG. 5A and FIG. 5B representatively illustrate the effect of wave form beam spoiling in accordance with an exemplary embodiment of the present invention. FIG. 5A shows how beam spoiling at short range allows for larger missile warning system (MWS) position error and total pointing error while still enabling target engagement. FIG. 5B shows how relative power density (accounting for range effect, pointing error loss, and beam spoiling loss) remains constant at short range when beam spoiling is used. A side-by-side comparison of FIG. 5A and FIG. 4 shows beam spoiling allows larger pointing error at close range, resulting in increased performance.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices.

Similarly, the software elements of the present invention may be implemented with any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, network control, and/or the like. Still further, the invention could be used to detect or prevent security issues with a client-side scripting language and/or the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

A suitably configured data network may include any system for exchanging data. Moreover, the system contemplates the use, sale, and/or distribution of any goods, services or information having similar functionality described herein. Computing units may be connected with each other via a data communication network. A variety of conventional communications media and protocols may be used for data links.

The present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means. For security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A target engagement system, said system comprising:
   a sensor module configured to detect a target and provide target tracking information;
   a control module coupled to the sensor module, the control module configured to provide targeting information in response to the target tracking information; and
   a directed-energy module configured to provide and direct a beam of microwave radiation towards the target in response to the targeting information, the beam configured to affect the trajectory of the target,
   wherein the directed-energy module is further configured to spoil the beam of microwave radiation based on the targeting information when a range to the target is less than a predetermined range.

2. The system of claim 1, wherein the sensor module comprises a plurality of infrared sensors and wherein at least one infrared sensor and at least one directed-energy module are collocated.

3. The system of claim 2, wherein the target tracking information is provided by at least two of said plurality of infrared sensors.

4. The system of claim 1, wherein the beam of microwave radiation comprises a wavelength from about $1 \times 10^{-3}$ meters to about $3 \times 10^{-2}$ meters.

5. The system of claim 1, wherein the beam of microwave radiation is configured to affect a guidance system of the target.

6. The system of claim 1, further comprising at least one of:
   a plurality of sensor modules;
   a plurality of control modules; and
   a plurality of directed-energy modules.

7. A method to deflect a target, comprising:
   a sensor module-detecting the target and providing target tracking information;
   a control module providing targeting information in response to the target tracking information;
   a directed-energy module generating and directing a beam of microwave radiation towards the target in response to the targeting information, the beam configured to affect the trajectory of the detected target; and
   the directed-energy module spoiling the beam of microwave radiation based on the targeting information when a range to the target is less than a predetermined range.

8. The method of claim 7, wherein the sensor module comprises a plurality of infrared sensors and wherein at least one infrared sensor and at least one directed-energy module are collocated.

9. The method of claim 7, wherein the target tracking information is provided by at least two of said plurality of infrared sensors.

10. The method of claim 7, wherein the beam of microwave radiation comprises a wavelength from about $1 \times 10^{-3}$ meters to about $3 \times 10^{-2}$ meters.

11. The method of claim 7, wherein the beam of microwave radiation is suitably configured to affect a guidance system of the target.

12. The method of claim 7, further comprising at least one of:
    a plurality of sensor modules;
    a plurality of control modules; and
    a plurality of directed-energy modules.

13. A method of target engagement comprising:
    providing a beam of microwave radiation configured to affect a guidance system of a target;
    directing the beam of microwave radiation towards the target in response to targeting information; and
    spoiling the beam of microwave radiation based on the targeting information when a range to the target is less than a predetermined range.

14. The target deflection method of claim 13, further comprising:
    a sensor module comprising at least one infrared sensor detecting the target, and providing tracking information; and
    a control module providing the targeting information in response to the tracking information.

15. The target deflection method of claim 13, beam of microwave radiation having a wavelength from about $1 \times 10^{-3}$ meters to about $3 \times 10^{-2}$ meters.

* * * * *